B. BORDEN.
PIPE THREADING TOOL.
APPLICATION FILED MAY 5, 1910.
1,069,381.
Patented Aug. 5, 1913.
2 SHEETS—SHEET 1.
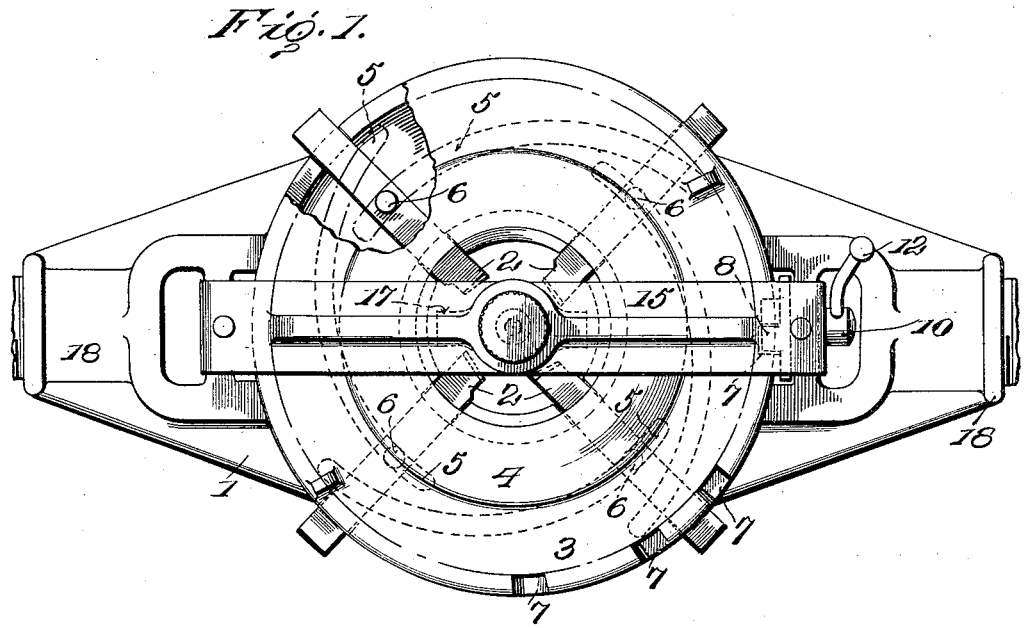
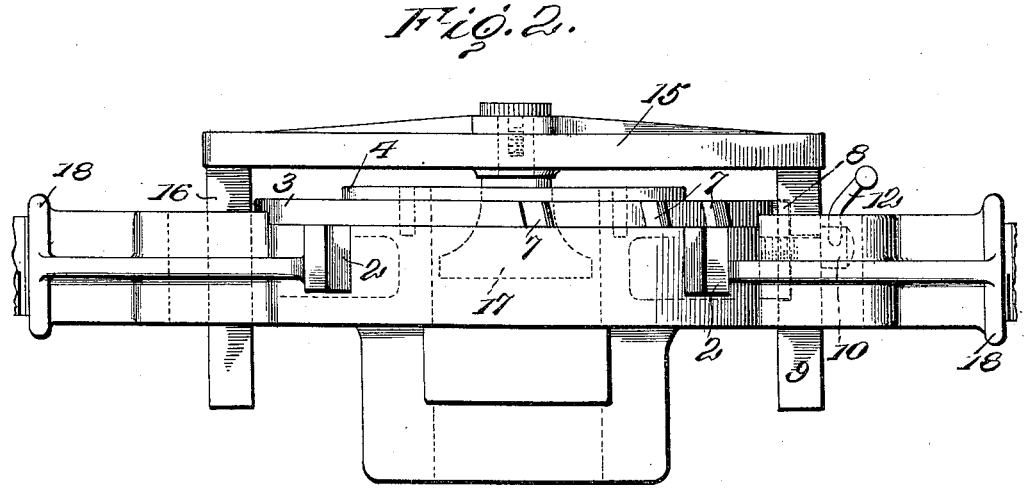
Witnesses
W. A. Williams
Francis P. Maguire
Inventor
Bradford Borden
By
Attorney B. BORDEN.
PIPE THREADING TOOL.
APPLICATION FILED MAY 5, 1910.
1,069,381.
Patented Aug. 5, 1913.
2 SHEETS—SHEET 2.
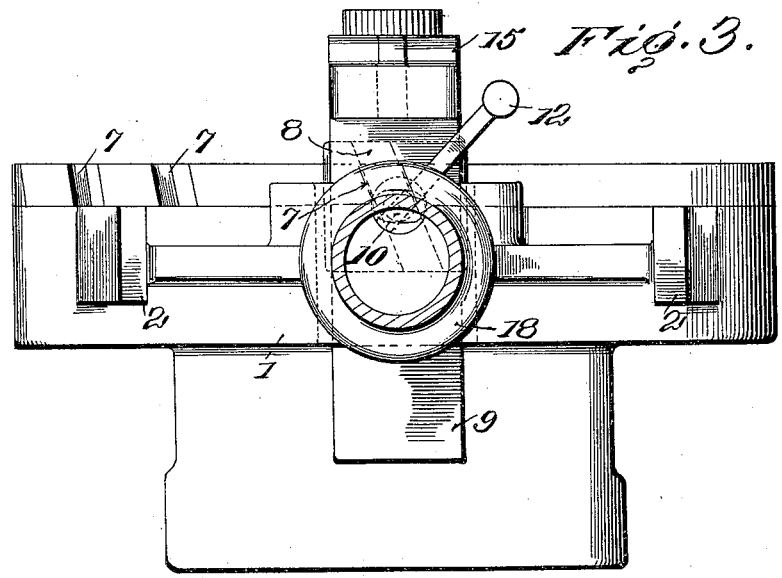
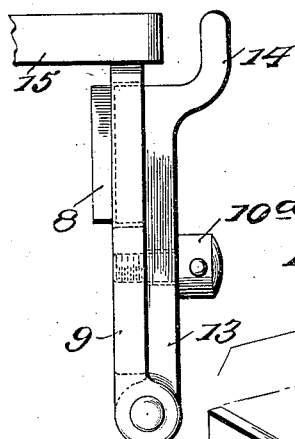
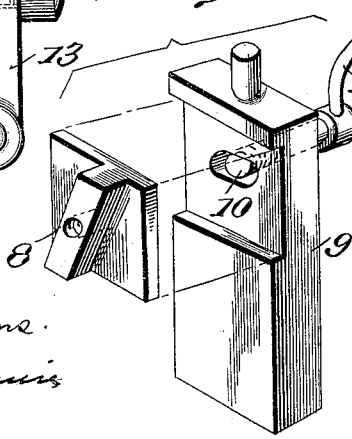
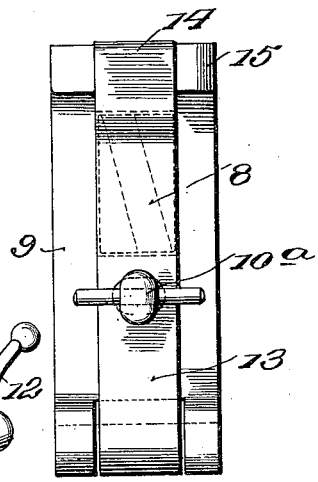
Witnesses
W. A. Williams
Francis P. Maguire
Inventor
Bradford Borden.
Attorney

UNITED STATES PATENT OFFICE.

BRADFORD BORDEN, OF TORONTO, ONTARIO, CANADA, ASSIGNOR TO THE BORDEN COMPANY, OF WARREN, OHIO, A CORPORATION OF OHIO.

PIPE-THREADING TOOL.

1,069,381.  Specification of Letters Patent.  Patented Aug. 5, 1913.

Application filed May 5, 1910. Serial No. 559,444.

*To all whom it may concern:*

Be it known that I, BRADFORD BORDEN, of Toronto, in the Province of Ontario, Dominion of Canada, have invented certain new and useful Improvements in Pipe-Threading Tools; and I do hereby declare the following to be a full, clear, and exact description of the invention, such as will enable others skilled in the art to which it appertains to make and use the same.

In the art of pipe threading tools difficulty has always been experienced in the use of work-holders by which the tools are mounted on the exterior of the pipe to be threaded, and which work-holders have usually embodied leader screws for drawing the chasers on and over the pipe. Grit and dirt frequently strip the threads of the leader screws and greatly shorten the life of the tool. In some instances it has been sought to inclose the leader screw to prevent the entrance of grit and dirt, but all such means have but added to the cost of construction and weight of the tool, and have not proved of much value. It has also been sought to minimize the difficulties by providing the work-holders with means for merely initiating the engagement of the dies or chasers with the pipe, but such means has required the use of chasers of special formation, and even then the engagement of the chasers with the pipe has been attended with considerable difficulty. Furthermore, such latter means has required the employment of special parts which have tended to increase the cost and add materially to the weight of the tool.

In the class of tools for cutting tapered threads, that is, those wherein the dies or chasers gradually recede as the cutting operation progresses, in order to secure a range of adjustment for pipes of different sizes the use of two plates has heretofore been necessary, one plate being in engagement with the chasers and the other plate with the controlling element by which the former plate is controlled in effecting the recession of the chasers. The use of a second plate not only increases the number of parts, and adds to the cost, but a stock so equipped is open to the further objection that grit and dirt entering between the plates will interfere with the free operation thereof, resulting in premature wear.

The object of the present invention is to produce a thread cutting tool of the same general character as above outlined which will dispense not only with a work-holder, but also with a second plate coöperating with the cam plate to permit the chasers to be set for pipes of different sizes, and which tool will possess all the advantages and none of the disadvantages which might be urged against tools having work-holders or two coöperating plates, thus simplifying the construction and operation, and reducing the cost of manufacture.

The invention will be hereinafter fully set forth and particularly pointed out in the claims.

In the accompanying drawings, Figure 1 is an end elevation. Fig. 2 is a side view. Fig. 3 is a similar view, but at right angles to Fig. 2. Figs. 4 and 5 show a slight modification. Fig. 6 is a detached view in perspective.

Referring to the drawings, 1 designates, the housing or chaser-carrier; 2 a series of radially arranged chasers; 3 a rotatable cam plate mounted on the chaser-carrier whereon it is held by a nut 4. The cam plate has on its inner face a series of eccentric grooves 5 for taking in lugs 6 of the several chasers, and in its periphery it has a series of cutouts or recesses 7 in any one of which is designed to fit a lug 8 which extends diagonally across the face of a post 9 by which it is carried. The number of cut-outs is regulated by the capacity of the tool. The lug 8 may be moved transversely of the post to set the chasers for cutting under or over standard. In Figs. 1, 2 and 3, I have shown the lug as detachably held to the face of the post by a binding screw 10, the head of which has a handle 12. This screw is passed through an elongated opening in the post to permit the lug to be moved transversely. The lug is shown in these figures as having a flattened base which fits against the grooved face of the post to form a firm bearing for the lug. If desired, however, the same result may be secured by making the post in two parts, as shown in Figs. 4 and 5, and mounting the lug on the outer part 13 and have it project through an opening in the inner part, said outer part being shown as pivoted at its inner or rear end to the main part of the post, and as held thereto by a binding screw 10ª. This second part is shown as having an outwardly projecting handle 14. To set the chasers for cutting under or over standard, the necessary adjustment is obtained by turning binding screw 10ª, and when it is desired to manually adjust the chasers, for pipes of different sizes, the part 13 of the post is swung outwardly on its pivot to disengage the lug from the cam plate, whereupon the latter may be turned axially.

Regardless of which form is used, the diagonally-arranged lug of the post constitutes the element for controlling the independent rotation of the cam plate, and thereby gradual recession of the chasers. The interlocking engagement of the lug with the cam plate will cause or permit the rotation of the latter. The post projects through an opening in the chaser-carrier, and at its outer end is connected to a cross bar 15, the same as in my first two before-noted applications for patents. This bar extends transversely across the face of the chaser-carrier, and at its opposite end has a guide post 16 which likewise projects through an opening in the chaser-carrier. According to the preferred form, when the chasers are to be adjusted for pipes of different sizes, the operator draws outwardly on the cross-bar until the lug of the post is free of the cam plate, allowing the latter to be freely turned to aline any one of the grooves with the lug, whereupon the cross-bar is moved inwardly to cause the lug to enter such groove. To the center of the cross-bar is secured a stop 17 which projects into the central opening of the housing so as to be engaged by the end of the pipe, with the result that the pressure of the latter, acting through the cross-bar, holds the post from traveling longitudinally with the chaser-carrier during the threading operation. I prefer to have the inner end of the stop 17 extend into the chaser-carrier to a point intermediate the inner and outer ends of the threaded portions of the chasers, as pointed out in my application for patent filed December 7, 1909, so that the relative movement between the chaser-carrier and the cross-bar and lug-carrying post will not begin until the chasers have taken hold of the pipe.

The chaser-carrier is shown as having sockets 18 for the customary handles by which it may be manipulated. During the threading operation the cam plate not only rotates with the chaser-carrier, but it has a movement independently thereof which is controlled by the lug-carrying post, and it is this independent movement which effects the gradual and uniform recession of the chasers.

The advantages of my present invention are apparent to those skilled in the art.

It will be seen that the number of parts is greatly reduced, thereby lessening the danger of injury by grit or dirt; also that the chasers are positively controlled regardless of the condition of the pipe metal; and that they may be readily and easily set for threading pipes of different sizes, and are capable of additional adjustment for under or over cutting.

I claim as my invention:—

1. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, and means adjustable on said post for interlocking with said plate for controlling the rotation thereof independently of the chaser-carrier.

2. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said chaser-engaging plate having cut-outs in its periphery, and a diagonally-arranged lug mounted on said post for entering any one of said cut-outs.

3. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said chaser-engaging plate having cut-outs in its periphery, and an adjustable diagonally-arranged lug carried by said post for entering any one of said cut-outs.

4. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said chaser-engaging plate having cut-outs in its periphery, a diagonally-arranged lug carried by said post for entering any one of said cut-outs, and a binding screw for adjustably holding said lug to said post.

5. In a pipe threading tool, the combination with a chaser-carrier, a series of radially-arranged chasers, and a chaser-engaging plate rotatable with, and also relatively to, the chaser-carrier, of means rotatable with the chaser-carrier and between which and said chaser-carrier there is a relative longitudinal movement during the cutting operation, such means directly engaging said chaser-engaging plate for causing the rotation thereof independently of the chaser-carrier, a support for such means extending transversely of the chaser-carrier, and a stop carried by said support to be engaged by the pipe to be threaded, such engagement resulting in the relative longitudinal movement between said means and the chaser-carrier.

6. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, means adjustable on said post for interlocking with said plate for controlling the rotation thereof independently of the chaser-carrier, a cross-bar extended transversely of the chaser-carrier and to which said post is connected, and a stop carried by said cross-bar and extending into the chaser-carrier to engage the pipe to be threaded.

7. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said chaser-engaging plate having cut-outs in its periphery, a diagonally-arranged lug adjustably mounted on said post for entering any one of said cut-outs, and a stop connected to said post and extending into the chaser-carrier to engage the pipe to be threaded.

8. In a pipe threading tool, the combination with a chaser-carrier, a series of radially-arranged chasers, and a chaser-engaging plate rotatable with, and also relatively to, the chaser-carrier, of a post rotatable with said chaser-carrier and between which latter and said post there is a relative longitudinal movement during the cutting operation, said chaser-engaging plate having cut-outs in its periphery, a diagonally-arranged lug carried by said post for entering any one of said cut-outs, means for adjustably holding said lug to said post, a cross-bar extended transversely of the chaser-carrier and to which said post is connected and a stop carried by said cross-bar and extending into the chaser-carrier to engage the pipe to be threaded.

In testimony whereof, I have signed this specification in the presence of two subscribing witnesses.

BRADFORD BORDEN.

Witnesses:
E. MERNER,
H. CHRISTMAN.

Copies of this patent may be obtained for five cents each, by addressing the "Commissioner of Patents, Washington, D. C."